May 27, 1969   I. R. NORSTRUD ET AL   3,446,238
PRESSURE ACTUATED VALVE
Filed Oct. 6, 1964

INVENTOR.
IVEN R. NORSTRUD,
JOHN H. THRELKELD
BY
Schroeder, Siegfried
& Ryan
ATTORNEYS United States Patent Office 3,446,238
Patented May 27, 1969

3,446,238
PRESSURE ACTUATED VALVE
Iven R. Norstrud and John H. Threlkeld, Britt, Iowa, assignors to Britt Tech Corporation, Britt, Iowa, a corporation of Iowa
Filed Oct. 6, 1964, Ser. No. 401,839
Int. Cl. F16k *17/20, 31/14;* G05d *7/00*
U.S. Cl. 137—469
6 Claims

ABSTRACT OF THE DISCLOSURE

The disclosure is directed to an improvement in a relief valve construction which is used primarily with a pressure washer. The improvement lies in the increased ability of the piston in the relief valve to "snap" between the open and closed positions by allowing the liquid to pass through passages formed in the piston. All of the liquid which is by-passed, passes through a restricted passage in the piston. The control member is also actuated by the piston and is used to control a switching device.

---

This invention relates to the field of fluid control valves and more particularly to an improved valve design of the relief type used in liquid systems.

The improved fluid control or pressure release valve of the present invention has application in fluid control systems such as is shown in our prior Patent 3,140,049 dated July 7, 1964, on "Cleaning Apparatus with Relief Control Valve." The instant pressure actuated valve or relief valve is an improvement over the relief valve shown and claimed in our co-pending application Ser. No. 247,126 dated Dec. 26, 1962, now Patent 3,195,556, entitled, "Control Valve."

Pressure actuated or relief valves of this particular type utilize orifices or fluid passage restrictions to establish control pressures in the operation of the relief valve. The present invention is directed to an improved pressure actuated or relief valve having the orifice or fluid restrictor passage therein to simplify the over-all valve design and to improve the operation of the same.

It is therefore, an object of this invention to provide an improved pressure actuated valve.

Another object of this invention is to provide an improved and simplified valve design having an orifice in the flow passage thereof to establish an operating pressure for the valve.

A further object of this invention is to provide a simplified pressure actuated valve or relief valve which is simple in construction and may be readily assembled and disassembled for maintenance purposes.

Figure 1:
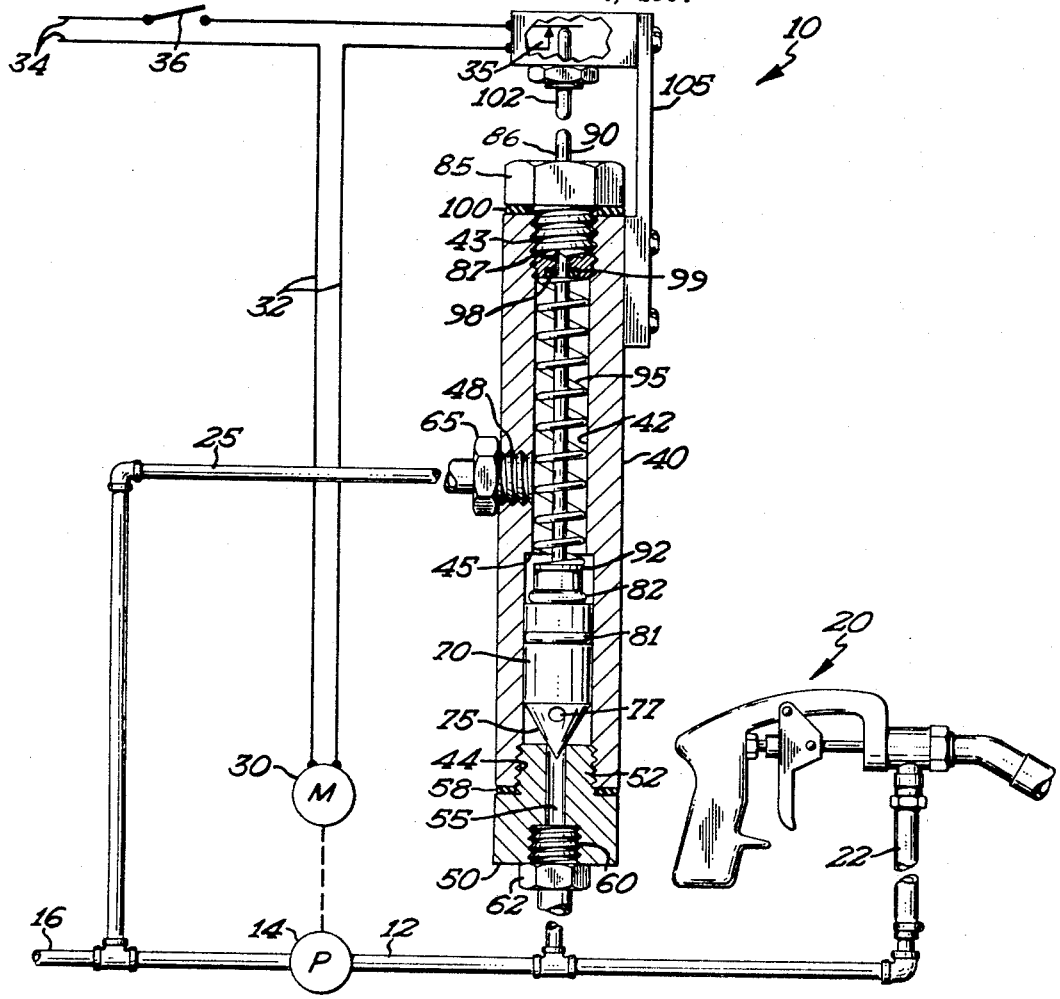
Figure 2:
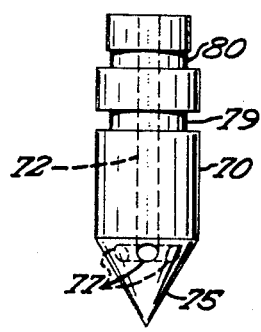
Figure 3:
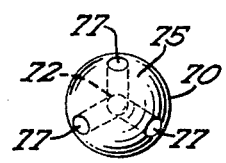

These and other objects of this invention will become apparent from a reading of the attached description together with the drawings wherein:

FIGURE 1 is a diagrammatic view of the improved pressure actuated relief valve showing an application of the same, FIGURE 2 is an elevation view of the valve closure member of the improved pressure actuated relief valve, and FIGURE 3 is a bottom view of the valve closure member of FIGURE 2.

The improved pressure actuated valve or relief valve of the present invention is shown generally at 10 as included in a system showing an application of the same. This system is shown in our prior Patent 3,140,049, on Cleaning Apparatus With Relief Valve Control and dated July 7, 1964. As will be seen in FIGURE 1 the relief valve is connected to a main fluid passage 12 extending from a pump 14 which is connected at its inlet to an inlet supply passage 16. The outlet passage 12 from the pump in addition to being connected to the relief valve 10 supplies or terminates in a fluid control device such as a nozzle 20 which is connected thereto through a fluid transmission line 22. Also connected to the relief valve is a by-pass passage 25 leading from the relief valve to the inlet side or conduit 16 of the pump. Pump 14 is driven by a suitable electric motor 30 which is energized through conductors 32 from an electrical source indicated by conductors 34. The electrical source includes in addition a switch type control element of the electrical type 35 mounted on and operated by the pressure relief valve. Also included in the energizing circuit is a manually operated switch 36 for initiating energization of the motor driving pump.

Relief valve 10 is comprised of a central cylindrical housing 40 having a longitudinal bore 42 extending therethrough and internal threaded extremities 43, 44. For purposes to be later noted, bore 42 is smaller at one extremity of the casing than at the other with the two internal diameters being separated by a shoulder portion 45 which is located adjacent to a transversely extending port 48 from the side of the cylindrical housing to the interior passage or bore.

Positioned in one end of the cylindrical housing 40 is a valve seat member 50 having a threaded extremity 52 adapted to fit into the threaded extremity 44 of the housing and including a port 55 extending therethrough with the internal surface at the threaded extremity of the port defining a valve seat for the relief valve. A suitable sealing means 58 is positioned between the valve seat member 50 and the end of the cylindrical housing 40 to seal the same. Valve seat member 50 has an internal tapped aperture 60 at the extremity opposite the valve seat portion in which is adapted to be positioned a conventional coupling member 62 for the purpose of connecting the relief valve to the main line passage and the liquid dispensing devices to be supplied from the pump 14. Similarly the by-pass conduit 25 is connected to the port 48 through a conventional coupling member 65 to connect the valve at the outlet side thereof through the by-pass conduit or piping to the inlet conduit or piping 16 leading to the pump.

Cooperating with the valve seat member 50 is a cylindrically shaped valve closure member 70 having a centrally located passage 72 therein which extends from one extremity of the cylindrical valve closure member to a conically shaped extremity 75 adapted to cooperate with the port 55 through a valve seat member 50 and define the operating relief valve. Centrally located passage 72 is connected to a plurality of transversely extending passages 77 which terminate on the conical surface 75 of the valve closure member and will best be seen in FIGURES 2 and 3 in elevation and bottom views. The cylindrical valve closure member also includes a pair of grooves 79 and 80 thereon in which are positioned O type sealing rings 81, 82 respectively. Cylindrical valve closure member 70 is positioned in the enlarged portion of the port 42 or passage extending through the cylindrical body 40 and between the shoulder portion 45 and the valve seat member 50 threaded into one extremity of the same such that it fits closely with the walls of the passage 42 and it is sealed in a sliding type seal therein by the seal members 81, 82. This limits the displacement of the valve closure member 70 within the body 40 of the relief valve and to one side of the transversely extending port 48.

The opposite extremity of the cylindrical housing 40 mounts a seal plug 85 having a centrally located port 86 therein and a threaded extremity 87 fitting into the internal threaded extremity 43 of the valve body. An operating shaft 90 is positioned in the valve body and carries a thrust plate 92 at one extremity adapted to bear against the valve closure member 70. Plate 92 serves as a base for a biasing spring 95 which is positioned to encircle the operating shaft 90 and abuts against one extremity of the thrust plate 92 and the closure member 85 of the other extremity. Suitable sealing means 98 are positioned in a groove 99 surrounding the port or aperture 86 in the closing plug 85 to seal the shaft to the valve plug to prevent leakage about the same. In addition, suitable sealing means 100 is positioned between the closure member 85 and the upper portion of the valve body to seal the valve body at this point. The operating shaft 90 extends beyond the end of closure member 85 and is adapted to contact an operating pin 102 of the electrical control device or switch 35 which is mounted on a valve body through a suitable supporting bracket 105 and connected thereto through suitable means. The electrical control device as shown herein is a simple switch in the electrical circuit to the motor 30 which is operated to a closed position whenever the valve closure member is withdrawn and is seated on the valve seat member 50. Whenever the valve closure member is raised off of the seat, flow is provided to the by-pass passage 25, and the operating shaft 90 engages the operating member 102 of the control switch 35 to open the contacts and de-energize the motor 30 driving the pump.

It will be noted that the relative size of port 55 in the valve seat member 50 is of a considreably smaller cross-sectional area than the total conical surface 75 of the valve closure member 70 exposed to fluid flow through the port. Further it will be noted that the portion of the valve closure member or its conical surface 75 actually seated within the port 55 of the valve seat member 50 to define the pressure relief valve is only a fraction of the total area exposed to fluid below the plunger when the valve is open. Further it will be recognized that a continuous passage exists through the plurality of radially extending ports 77, three of which are shown in FIGURE 3 and which communicate with the centrally located restricted passage 72 through the valve closure member. The relative size of the passage 72 is such as to be significantly smaller than the passage 55 to define a restriction through the valve closure member and limit the flow therethrough.

In a normal operation of the pressure relief valve, a significantly high pressure must be exposed from the line 12 through the port 55 to cause the valve closure member 70 acting against the spring 95 to overcome the force of the spring. After the valve closure member 70 begins to leave the port 55 a change in force occurs by the exposure of the entire conical surface 75 of the valve closure member to the inlet pressure causing the valve closure member to move rapidly to a position limited by the presence of the shoulder 45 in the cylindrical casing. Thus the biasing force of the spring 95 will be rapidly overcome and the pressure relief valve will snap to an open position in which fluid flow from the line 12 through the port 55 and passages 77 and 72 to the portion of the cylindrical housing or bore 42 above the valve closure member is obtained. This flow will be connected or directed through the port 48 and into the by-pass line relieving this pressure. The piston or valve closure member 70 will remain vertically displaced in the bore 42 of the cylindrical housing and remote from the valve seat as fluid flows through the relief valve and the orifice or restricted passage 72 within the valve closure member. This will establish a pressure in the by-pass line and below the piston for the purpose of holding the valve open until the pressure has dropped to a predetermined value at which point the force of the spring 95 will overcome the force of the fluid on the opposite extremity of the valve closure member to again close the relief valve.

In the diagrammatic disclosure of the example of the use of the relief valve, it is contemplated that the motor 30 will be energized by closing the manual switch 36 and connecting the electrical source 34 through the electrical control element 35 to energize the motor. This will cause operation of the pump to supply fluid under pressure from the source 16 to the main transmission line 12 and the devices to be operated, such as the nozzle heads 20. As long as the pressure from the pump is maintained at a predetermined level through operation of the various devices to be controlled, the relief valve will not operate. This is determined by operation of the nozzles. A drop in pressure in the transmission line does not affect the operation of the pressure relief valve inasmuch as its control element 35 is continuously closed when the valve 10 is closed and the motor is under control of the manual switch 36. However, whenever a predetermined pressure is obtained by virtue of continuous operation of the pump with no operation of the control devices, an abnormally high pressure will be admitted through the by-pass line 25 back to the inlet through snap type operation of the pressure relief valve 10. Thus the build up of pressure in the conduit or transmission line 12 will apply a force on a portion of the control surface 75 of the valve closure member 70 exposed to the valve seat port 55 to overcome the force of the spring. Once the valve closure member starts to move, it will be snapped upward as the entire conical surface 75 is exposed to the pressure in the main transmission line. Flow of this fluid through the valve closure member and the restricted orifice will establish a pressure at the conical surface of the valve closure member to maintain the valve open until pressure has dropped to a suitable safe level at which point the valve closure member will be moved down against the force of the fluid on the conical surface 75 by virtue of the biasing force supplied through the spring. As the valve closure member is moved upward, the electrical control element is engaged and operated through movement of the shaft 90 into engagement with the operating member 102 of the switch 35 opening the contacts and de-energizing the motor 30 to stop the pumping action. This will permit a drop in pressure or a holding of pressure in the transmission lines until it is further dropped by operation of the nozzles 20 to a point where the valve closure member moves to the closed position again making the electrical contacts 35 and causing operation of the motor 30 and resumption of the pumping operation.

This improved pressure relief valve provides a relatively simple structure which is readily manufactured, may be easily assembled and disassembled for maintenance purposes, and which includes the restriction within the valve closure member to eliminate further inclusion of parts.

In considering this invention, it should be remembered that the present disclosure is intended to be illustrative only and the scope of the invention should be determined by the appended claims.

What is claimed is:

1. A pressure actuated valve comprising, a tubular body member, a valve seat member connected to one extremity of the tubular body member, said valve seat member having a port therethrough terminating in the tubular body member, a piston type valve closure member positioned in the tubular body and having a conically shaped extremity adapted to cooperate with the port of the valve seat member in the tubular body member to control flow through the port, a passage in the piston type valve closure member terminating in a transverse passage means in the conically shaped extremity remote from the portion of the extremity cooperating with the port of the valve seat member, said passage having a predetermined cross-sectional area substantially reduced from the cross-sectional area of the port in the valve seat member, a spring retaining member connected to the other end of the tubular body, spring means positioned in the body abutting the spring retaining member and the piston to apply a predetermined force to the piston, an outlet passage positioned in the tubular body between the piston and the spring retaining member to provide for flow from the inlet valve seat member through the passage in the piston and the tubular body member.

2. The pressure activated valve of claim 1 in which the internal cross-sectional area of the tubular member is substantially greater than the cross-sectional area of the port in the valve seat member such that flow through said valve will apply a force through the conical extremity of the piston member to be balanced by the force of the spring on the opposite end of the piston member.

3. The pressure actuated valve of claim 2 and including frictional sealing means mounted on said piston member and bearing against the interior of the tubular body to seal the piston member to the body at this point.

4. The pressure actuated valve of claim 3 and including means within the tubular body to limit the displacement of the piston type valve closure member upon flow through the valve body such that the piston type valve closure member does not block the outlet passage through the tubular body.

5. The pressure actuated valve of claim 4 in which the passage through the piston type valve closure member includes a centrally located passage terminating in a plurality of radially extending passages in the conically shaped extremity of the piston type valve closure member.

6. The pressure actuated valve of claim 5 and including an electric control element connected to and spaced from the tubular body, actuating shaft means journaled in and sealed to the spring retaining member and extending into the tubular body and in contact with the piston type closure member to be moved thereby to operate the electric control element with movement of the valve closure member.

References Cited
UNITED STATES PATENTS

| | | | |
|---|---|---|---|
| 2,295,931 | 9/1942 | Caminez | 137—469 X |
| 2,594,626 | 4/1952 | Earle | 137—473 |
| 3,140,049 | 7/1964 | Norstrud | 239—126 |
| 3,149,643 | 9/1964 | Breitsprecher | 137—469 |

HAROLD W. WEAKLEY, *Primary Examiner.*

U.S. Cl. X.R.

137—108